(12) United States Patent
Foerg et al.

(10) Patent No.: US 7,897,668 B2
(45) Date of Patent: Mar. 1, 2011

(54) ADDITIVE FOR AND A METHOD OF IMPROVING EARLY RESISTANCE TO DRIVING RAIN OF COATING COMPOSITIONS

(75) Inventors: Christian Foerg, Dillishausen (DE); Klaus Gebauer, Langerringen-Gennach (DE); Herbert Muenzenberger, Wiesbaden (DE); Sebastian Simon, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/459,616

(22) Filed: Jul. 2, 2009

(65) Prior Publication Data
US 2010/0010132 A1   Jan. 14, 2010

(30) Foreign Application Priority Data
Jul. 8, 2008  (DE)  ........................ 10 2008 032 083

(51) Int. Cl.
*C08L 91/06* (2006.01)
*C08J 3/02* (2006.01)

(52) U.S. Cl. ........................................ 524/277; 106/271
(58) Field of Classification Search ................... 524/277
See application file for complete search history.

(56) References Cited

U.S. PATENT DOCUMENTS 6,383,502 B1 *  5/2002  Dunshee et al. ............. 424/401

\* cited by examiner

*Primary Examiner*—Ling-Siu Choi
*Assistant Examiner*—Hui Chin
(74) *Attorney, Agent, or Firm*—Abelman, Frayne & Schwab

(57) ABSTRACT

An additive for improving the early resistance to driving rain of physically curing coating compositions based on aqueous acrylate dispersions, which have been adjusted to an alkaline pH, is characterized by a basically adjusted aqueous bees wax emulsion containing an aqueous dispersion and at least one representative of the group comprising 1,3-dihydroxy-2,2,4-trimethylpentane and esters thereof, butyl diglycol acetate and methoxypropanol as film-forming agents, as well as optionally a pigment and optionally an ammonium acrylate as pigment disperser.

15 Claims, No Drawings

ADDITIVE FOR AND A METHOD OF IMPROVING EARLY RESISTANCE TO DRIVING RAIN OF COATING COMPOSITIONS

BACKGROUND OF THE INVENTION

1. Field of Invention

The present invention relates to an additive for improving early resistance to driving rain of physically curing coating compositions based on aqueous acrylate dispersions and a method of improving early resistance to driving rain of such compositions.

2. Description of the Prior Art

Physically curing coating compositions based on aqueous acrylate dispersions, which contain, as essential components, an aqueous acrylate latex, inorganic fillers and conventional ancillary materials such as defoamers, plasticizers, preservatives, extenders, wetting agents, dispersants and thickeners, are used on a large scale for coating surfaces exposed temporarily to the effects of weather. The strictly physical drying of the coating composition is a disadvantage of such systems, especially when they are used as fire protection coatings, which require the use of wet layers with a thickness of 3 mm or more. On the one hand, such drying depends greatly on environmental conditions, especially on the relative humidity and on the temperature of the air. On the other, if a skin is formed quickly, the further drying of the film slows down due to the resulting vapor barrier. At the present time, accordingly, either long drying times are accepted or the systems are changed over to solvent-containing systems or systems having a high solids content. Such systems are based on clearly more expensive raw materials and, due to solvent vapors, represent a possible danger to man and the environment.

The German Publication DE 199 56 128 A1 describes fast drying, aqueous coating compositions, which contain an aqueous binder and at least one water-soluble, quaternary poly(allylamine) and, with that, exhibit accelerated drying properties without discoloring noticeably during the drying.

The European Patent EP 0 804 514 B1 already discloses a fast curing aqueous coating composition, which is used particularly as a paint for street markings and, very soon after it is applied on the surface of a traffic route, forms a hard, grease-resistant surface, which permits normal traffic to be resumed with a minimum interruption. This coating composition comprises 90 to 99.6% by weight of an anionically stabilized, aqueous emulsion of a copolymer of ethylenically unsaturated monomers, which contains a polyimine with a molecular weight of 250 to 20,000 and a volatile base. With such a coating composition, it becomes possible to produce fast drying coatings with a wet film thickness of only up to 0.5 mm.

However, such coating compositions are not suitable for producing thicker applied layers, particularly when the surfaces, which are to be treated, extend vertically, as is customary, in addition to the horizontal application, in the case of a fire-protection coating for a fagade application. Moreover, the rapid curing of previously known coating compositions is achieved by a rapid formation of a surface film, which, because of the decreased diffusion of water vapor through the surface film leads to unsatisfactorily long curing times in the case of thicker layers, which is serious especially when a vigorous rain, such as a driving rain occurs after the application of the coating composition and can cause components of the coating composition to wash or bleed out or the whole coating to wash off. Accordingly, the thin surface layer may be destroyed by the impact of the rain and the uncured material underneath may be washed off.

A further disadvantage of such physically curing coating compositions based on aqueous acrylate dispersions is seen to lie therein that, before they are cured, their resistance to driving rain is inadequate. Driving rain is defined as a heavy rain, the drops of which, depending on the drop size and the wind velocity, can result in damage to a coating composition, which has not yet cured, in that surface regions, which have not yet cured sufficiently, are washed out or beaten out of an application joint. This may lead to a bleeding of the fillers contained in the coating composition or, in the case of a breakdown, to a decreased strength of the coating film that finally cures. This is particularly serious for coating multistory facades, the lower coating regions of which, which have not yet been cured adequately, may be washed out in the event of a heavy rainfall. Both lead to a decreased tightness with respect to smoke or gas up to the tearing of the coating by movement of the treated surface with failure of the protective action resulting therefrom in the case of a fire.

The occurrence of driving rain must therefore be taken into consideration for the construction of building structures. Resistance to driving rain accordingly is understood to be the property of a surface to withstand this heavy rain permanently.

However, it is also of great importance to achieve a sufficiently large early resistance to driving rain, that is, the property of a physically curing coating composition based on aqueous acrylate dispersions to withstand the effect of such a driving rain even shortly after the application of the composition and before the complete curing thereof. Such water-based coating compositions, after the application thereof on the surface to be treated, pass through a period of time, the curing phase, during which the coating composition is water soluble and, accordingly, not resistant to driving rain. This is necessarily the case with the water-based systems normally used, since said systems are intended to be water-soluble during the processing and can easily be cleaned with water. Within the scope of the present invention, the period of time between this system-inherent lack of resistance to driving rain, from the application on the surface to be treated up to the time at which resistance to driving rain is achieved, is referred to as early resistance to driving rain. The shorter the early resistance to driving rain of such a water-based coating composition, the less is the risk of damage by any driving rain, which may occur, to a freshly applied coating before the latter has cured.

SUMMARY OF THE INVENTION

It is an object of the present invention now to provide additive with which an improvement in the early resistance to driving rain of physically curing coating compositions based on aqueous acrylate dispersions can be attained.

Another object of the present invention is to provide an additive with which the physically curing coating compositions are cured more rapidly and, with that, attain early resistance to driving rain and are not to form a skin, which prevents further necessary drying, or merely a thickened coating composition, which is incapable of withstanding driving rain.

A further object of the present invention is to provide an additive with which would in comparison to conventional coating compositions of the type under consideration, the drying time is shortened significantly over a wide range of temperatures and relative humidities and this is accomplished with a slight amount of additive.

This and other objects of the present invention, which will become apparent hereinafter, are achieved by providing an additive for improving the resistance to driving rain of physically curing coating compositions based on an aqueous acrylate dispersion, which has been adjusted to an alkaline pH with an organic base volatile at ambient temperatures and which is characterized by a basically adjusted aqueous beeswax emulsion containing an aqueous dispersion and at least one representative of the group comprising 1,3-dihydroxy-2, 2,4-trimethylpentane and esters thereof, butyl diglycol acetate and methoxypropanol as film-forming agents, as well as optionally a pigment and optionally an ammonium acrylate as pigment disperser.

Due to the use of the necessary components, the inventive coating composition makes accelerated drying possible owing to the fact that the water, contained in the coating composition, can evaporate azeotropically, the minimum film-forming temperature is lowered and, after the first formation of film, a hydrophobic surface is produced, which reduces penetration of water, such as rain water, into the coating; however, but does not decrease the diffusion of water vapor into the atmosphere.

If the inventive additive is incorporated in the coating composition in an amount of 5 to 35% by weight, preferably of 8 to 15% by weight and, for example, of 10% by weight of the coating composition, a shortening of the curing time from 24 hours to 10 hours can be achieved at 23° C. and a relative humidity of 50%. At the same time, a correspondingly accelerated film formation can also be attained at other temperatures such as 5° C. or 40° C. and other relative humidities ranging from 0% to 90%.

As a basically adjusted, aqueous bees wax emulsion, the inventive additive preferably contains an emulsifier-free beeswax dispersion or a beeswax dispersion, stabilized in some other way, with a hydrophobizing effect and a beeswax content ranging from 5 to 35% by weight and preferably from 8 to 15% by weight, and has a pH of 9 to 13 and preferably of 10 to 12 and especially of 11. A particularly preferred beeswax dispersion is obtainable commercially from the Byk Cera Company under the name of Aquacer 560.

As film-forming agent, the inventive coating composition preferably contains 1,3-dihydroxy-2,2,4-trimethylpentane, 1,3-dihydroxy-2,2,4-trimethylpentane monopropionate, 1,3-dihydroxy-2,2,4-trimethylpentane dipropionate, 1,3-dihydroxy-2,2,4-trimethylpentane monoisopropionate, 1,3-dihydroxy-2,2,4-trimethylpentane diisopropionate, 1,3-dihydroxy-2,2,4-trimethylpentane monobutyrate, 1,3-dihydroxy-2,2,4-trimethylpentane dibutyrate, 1,3-dihydroxy-2,2,4-trimethylpentane monoisobutyrate and 1,3-dihydroxy-2,2,4-trimethylpentane diisobutyrate, well as mixtures of two or more of these compounds.

The inventive coating composition may optionally contain an organic and/or an inorganic pigment, preferably $Fe_3O_4$ or zinc borate, as well as a pigment disperser, such as a polymer based on ammonium acrylate with a solids content of 35% and a pH of between 7.5 and 9.5.

A particularly preferred embodiment of the inventive additive is in the form of an aqueous dispersion, which contains 41.0 to 51.0% by weight of the aqueous bees wax emulsion with a wax content of 15.0% by weight, 40.0 to 52.0% by weight of a film-forming agent, 5.0 to 10.0% by weight of a pigment and 0.5 to 2.0% by weight of a pigment dispersing agent.

A further object of the invention is a method of improving the early driving-rain resistance of physically curing coating compositions based on aqueous acrylate dispersions, which have been adjusted to an alkaline pH. The inventive method consists in that 5 to 35% by weight, preferably 10 to 20% by weight and particularly 10% by weight of the above-defined inventive additive is incorporated into the coating composition before the use of the latter as intended and mixed uniformly therewith, which can easily be checked visually by the user of a pigment in the additive.

The inventive additive is incorporated particularly advantageously into conventional commercial fire-protection coating compositions, which contain an aqueous acrylate latex, as well as defoamers, plasticizers, preservatives, fillers, extenders, wetting agents, dispersants and thickeners as conventional, commercial ancillary materials and are adjusted to a pH ranging from 8.0 to 9.0 and preferably of 8.5.

By using the inventive additive, rapid drying of the film, which is achieved with the inventive coating composition and has a thickness of several millimeters, can be accomplished even at low temperatures and high relative humidities. The optional addition of the additive to conventional coating compositions, especially fire protection compositions, enables the user to be flexible and to employ the inventive additive when needed, especially in the case of a threatening downpour. Due to the more rapid drying, achieved according to the invention, early resistance to rain is attainable and, with that, an intact film is assured, which has adequate permeability to water vapor and, with that, makes the necessary drying possible and, at the same time, produces a cured dry coating, which ensures the fire protection aimed for, as well as the tightness to smoke and gas and, with that, guarantees the main requirements of the fire protection properties of the coating composition.

DETAILED DESCRIPTION OF THE PREFERRED EMBODIMENTS

The preferred embodiments of the invention will be described by way of the following examples and comparison examples.

EXAMPLE 1

The inventive additive is prepared by mixing the following components:
- 46% by weight of beeswax emulsion containing 15% by weight of beeswax and having a pH of 11.0 (Byk Aquacer 560)
- 46% of 1,3-dihydroxy-2,2,4-trimethylpentane isobutyrate (Texanol)
- 7% by weight of black iron oxide pigment ($Fe_3O_4$ 1309-38-2)
- 1% by weight of an aqueous solution of an ammonium acrylate polymer (Pigment Dispersant A, BASF)

A liquid additive mixture is obtained, which can be incorporated readily into water-based, physically curing coating compositions based on aqueous acrylate dispersions.

EXAMPLE 2

Application Example

A conventional fire protection coating composition of the following composition is used:
- 55% by weight of an aqueous acrylate dispersion
- 10% by weight of water
- 28% by weight of chalk and/or aluminum hydroxide as mixture filler
- 1% by weight of ammonia
- 6% by weight of conventional ancillary materials The aqueous acrylate dispersion is the aqueous dispersion of an ethyl acrylate/2-ethylhexyl acrylate/acrylonitrile/acrylic acid/N-methylol acrylamide copolymer with a solids content of 58% by weight and a particle size distribution of the copolymer ranging from 0.2 to 0.4 µm.

Defoamers, plasticizers, preservatives, wetting agents, fungicides, pigments and thickeners are contained as conventional ancillary materials.

The fire-protection coating composition is adjusted to a pH of 8.5.

Into this fire-protection coating composition, 10% by weight of the additive mixture of Example 1 is incorporated, using a drill with a mortar stirrer attachment or a different suitable stirrer attachment for achieving a homogeneous color.

The mixture, obtained in this manner, can be processed over a period of at least 3 hours. The drying time until the resistance to driving rain is attained at a temperature of 23° C. and a relative humidity of 50% is decreased from about 24 hours to 10 hours in comparison to fire-protection coating compositions without the additive.

In this connection, the early resistance to driving rain is understood to be the earliest time, at which a coating sample can withstand the driving rain resistance test without damage. This test consists of allowing drops of water to fall uniformly at room temperature from a height of 4 m onto the coating sample, which is arranged at an angle of 45°, at a rate of 250 mL in 15 minutes. On the average, 4 drops per second fall on the sample. The test is regarded as having been passed if the sample withstands the test without damage. The earliest drying time, at which the test is passed, is determined.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An additive for improving the early resistance to driving rain of physically curing coating compositions based on aqueous acrylate dispersions, which have been adjusted to an alkaline pH, comprising basically adjusted aqueous beeswax emulsion containing an aqueous dispersion, and at least one representative of the group comprising 1,3-dihydroxy-2,2,4-trimethylpentane and esters thereof, butyl diglycol acetate, and methoxypropanol as film-forming agents, as well as optionally a pigment and optionally an ammonium acrylate as pigment disperser.

2. The additive of claim 1, wherein it contains 5 to 35% by weight of an aqueous beeswax emulsion with a pH of 9 to 13.

3. The additive of claim 1, wherein the wax portion of the aqueous beeswax emulsion has a melting point within the range of 50° to 90° C.

4. The additive of claim 1, wherein as film-forming agent, it contains at least one representative of the group containing 1,3-dihydroxy-2,2,4-trimethylpentane, 1,3-dihydroxy-2,2,4-trimethylpentane mono-propionate, 1,3-dihydroxy-2,2,4-trimethylpentane dipropionate, 1,3.-dihydroxy -2,2,4-trimethylpentane monoisopropionate, 1,3-dihydroxy-2,2,4-trimethylpentane diisopropionate, 1,3-dihydroxy-2,2,4-trimethylpentane monobutyrate, 1,3-dihydroxy-2,2,4-trimethylpentane dibutyrate, 1,3-dihydroxy-2,2,4-trimethylpentane monoiso-butyrate and 1,3-dihydroxy-2,2,4-trimethylpentane diisobutyrate.

5. The additive of claim 1, wherein it contains an organic and an inorganic pigment.

6. The additive of claim 1, wherein it contains an ammonium acrylate with a solids content of 35% and a pH between 7.5 and 9.5 as pigment dispersing agent.

7. The additive of claim 1, comprising an aqueous dispersion which contains 41.0 to 51.0% by weight of the aqueous beeswax emulsion with a wax content of 15.0% by weight, 40.0 to 52.0% by weight of a film-forming agent, 5.0 to 10.0% by weight of a pigment and 0.5 to 2.0% by weight of a pigment dispersing agent.

8. A method of improving the early resistance to driving rain of physically curing coating compositions based on aqueous acrylate dispersions, which are adjusted to an alkaline pH, the method comprising the steps of providing an additive of basically adjusted aqueous beeswax emulsion containing an aqueous dispersion and at least one representative of the group comprising 1,3-dihydroxy-2,2,4-trimethylpentane and esters thereof, butyl diglycol acetate and methoxypropanol as film-forming agents, as well as optionally a pigment and optionally an ammonium acrylate as pigment disperser; and incorporating 5 to 20% by weight of the additive into the coating composition before the latter is used as intended.

9. The method of claim 8, wherein the additive is incorporated into a conventional commercial fire-protection coating composition, which contains an aqueous acrylate latex, as well as defoamers, pesticides, preservatives, fillers, extenders, wetting agents, dispersants and thickeners as conventional ancillary materials and has a pH in the range of 8.0 to 9.0.

10. The additive of claim 2, wherein it contains 8 to 15% by weight of aqueous beeswax emulsion with a pH of 10 to 12.

11. The additive of claim 3, wherein the wax portion of the aqueous beeswax emulsion has a melting point within the range of 60° to 80 ° C.

12. The method of claim 8, wherein the additive incorporates 8 to 15% by weight of the additive into the coating composition before the latter is used as intended.

13. The method of claim 9, wherein the coating has a pH of 8.5.

14. The additive of claim 1, wherein it contains one of organic pigment and inorganic pigment.

15. The additive of claim 1, wherein it contains $Fe_3O_4$.

* * * * *